(12) United States Patent
Hidaka et al.

(10) Patent No.: US 12,424,691 B2
(45) Date of Patent: Sep. 23, 2025

(54) ENERGY STORAGE APPARATUS

(71) Applicant: GS Yuasa International Ltd., Kyoto (JP)

(72) Inventors: Tsuyoshi Hidaka, Kyoto (JP); Yasuyuki Iwashima, Kyoto (JP); Shun Sasaki, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 864 days.

(21) Appl. No.: 17/418,567

(22) PCT Filed: Dec. 5, 2019

(86) PCT No.: PCT/JP2019/047530
§ 371 (c)(1),
(2) Date: Jun. 25, 2021

(87) PCT Pub. No.: WO2020/137411
PCT Pub. Date: Jul. 2, 2020

(65) Prior Publication Data
US 2022/0069400 A1    Mar. 3, 2022

(30) Foreign Application Priority Data
Dec. 27, 2018  (JP) ................... 2018-244351

(51) Int. Cl.
*H01M 50/209* (2021.01)
*H01M 50/213* (2021.01)
(Continued)

(52) U.S. Cl.
CPC ....... *H01M 50/213* (2021.01); *H01M 50/209* (2021.01); *H01M 50/507* (2021.01); *H01M 50/588* (2021.01); *H01M 50/593* (2021.01)

(58) Field of Classification Search
CPC .. H01M 50/209; H01M 50/24; H01M 50/507; H01M 50/593
See application file for complete search history.

(56) References Cited

U.S. PATENT DOCUMENTS

| 6,287,150 | B1 | 9/2001 | Oda et al. |
| 2011/0200862 | A1 | 8/2011 | Kurosawa |

(Continued)

FOREIGN PATENT DOCUMENTS

| JP | 2000-243366 A | 9/2000 |
| JP | 2011-171029 A | 9/2011 |

(Continued)

OTHER PUBLICATIONS

International Search Report (ISR) (PCT Form PCT/ISA/210), in PCT/JP2019/047530, dated Feb. 25, 2020.

*Primary Examiner* — Jonathan G Jelsma
(74) *Attorney, Agent, or Firm* — MCGINN I.P. LAW GROUP, PLLC

(57) ABSTRACT

An energy storage apparatus includes a plurality of energy storage devices arranged in a first direction and having electrode terminals on a second direction side intersecting the first direction and a side member disposed on a third direction side intersecting the first direction and the second direction of the plurality of energy storage devices. The side member has a side member protruding portion protruding to a side opposite to the third direction and being disposed on the second direction side of the energy storage device and on the first direction side of the electrode terminal of the energy storage device.

9 Claims, 7 Drawing Sheets

(51) Int. Cl.
    *H01M 50/507*     (2021.01)
    *H01M 50/588*     (2021.01)
    *H01M 50/593*     (2021.01)

(56) References Cited

U.S. PATENT DOCUMENTS

| | | | |
|---|---|---|---|
| 2014/0220391 A1* | 8/2014 | Fujii | H01M 50/264 |
| | | | 429/7 |
| 2015/0064542 A1* | 3/2015 | Noh | H01M 50/291 |
| | | | 429/156 |
| 2016/0149180 A1 | 5/2016 | Tokoo et al. | |
| 2016/0190526 A1* | 6/2016 | Yamada | H01M 50/264 |
| | | | 180/68.5 |
| 2016/0301051 A1 | 10/2016 | Kubota et al. | |
| 2018/0123105 A1 | 5/2018 | Tokoo et al. | |
| 2018/0130991 A1 | 5/2018 | Kim | |
| 2020/0295321 A1* | 9/2020 | Omura | H01M 50/503 |

FOREIGN PATENT DOCUMENTS

| | | | |
|---|---|---|---|
| JP | 2014-229351 A | 12/2014 |
| JP | 2015-005362 A | 1/2015 |
| JP | 2015-050187 A | 3/2015 |
| JP | 2015-082391 A | 4/2015 |
| JP | 2015-103346 A | 6/2015 |
| JP | 2015-185415 A | 10/2015 |
| JP | 2017-174831 A | 9/2017 |
| WO | WO 2013/031614 A1 | 3/2013 |
| WO | WO 2017/163696 A1 | 9/2017 |

* cited by examiner

ENERGY STORAGE APPARATUS

TECHNICAL FIELD

The present invention relates to an energy storage apparatus including a plurality of energy storage devices and a side member arranged on a side of the plurality of energy storage devices.

BACKGROUND ART

Conventionally, there has been widely known an energy storage apparatus including a plurality of energy storage devices and side members arranged on sides of the plurality of energy storage devices. Patent Document 1 discloses a power supply apparatus (energy storage apparatus) including a plurality of battery cells (energy storage devices) and side plates (side members). Each side plate has an elastic portion facing the terminal surface of each battery cell, and the elastic portion presses an insulating portion between the elastic portion and the battery cell.

PRIOR ART DOCUMENT

Patent Document

Patent Document 1: WO 2017/163696 A

SUMMARY OF THE INVENTION

Problems to be Solved by the Invention

In the energy storage apparatus having the conventional configuration as described above, it is not possible to sufficiently secure a space for regulating the movement of the energy storage device by the side members.

An object of the present invention is to provide an energy storage apparatus capable of easily regulating the movement of energy storage device.

Means for Solving the Problems

An energy storage apparatus according to one aspect of the present invention includes a plurality of energy storage devices arranged in a first direction and having electrode terminals on one side in a second direction intersecting the first direction and a side member arranged on a side of the plurality of energy storage devices in a third direction intersecting the first direction and the second direction. The side member has a first protruding portion protruding in a direction opposite to the third direction and being arranged on the one side in the second direction of a first energy storage device among the plurality of energy storage devices and on the one side in the first direction of an electrode terminal of the first energy storage device.

The present invention can be implemented not only as such an energy storage apparatus but also as a side member and an insulating plate included in the energy storage apparatus.

Advantages of the Invention

The energy storage apparatus according to the present invention can easily regulate the movement of the energy storage device.

MODE FOR CARRYING OUT THE INVENTION

Figure 1:
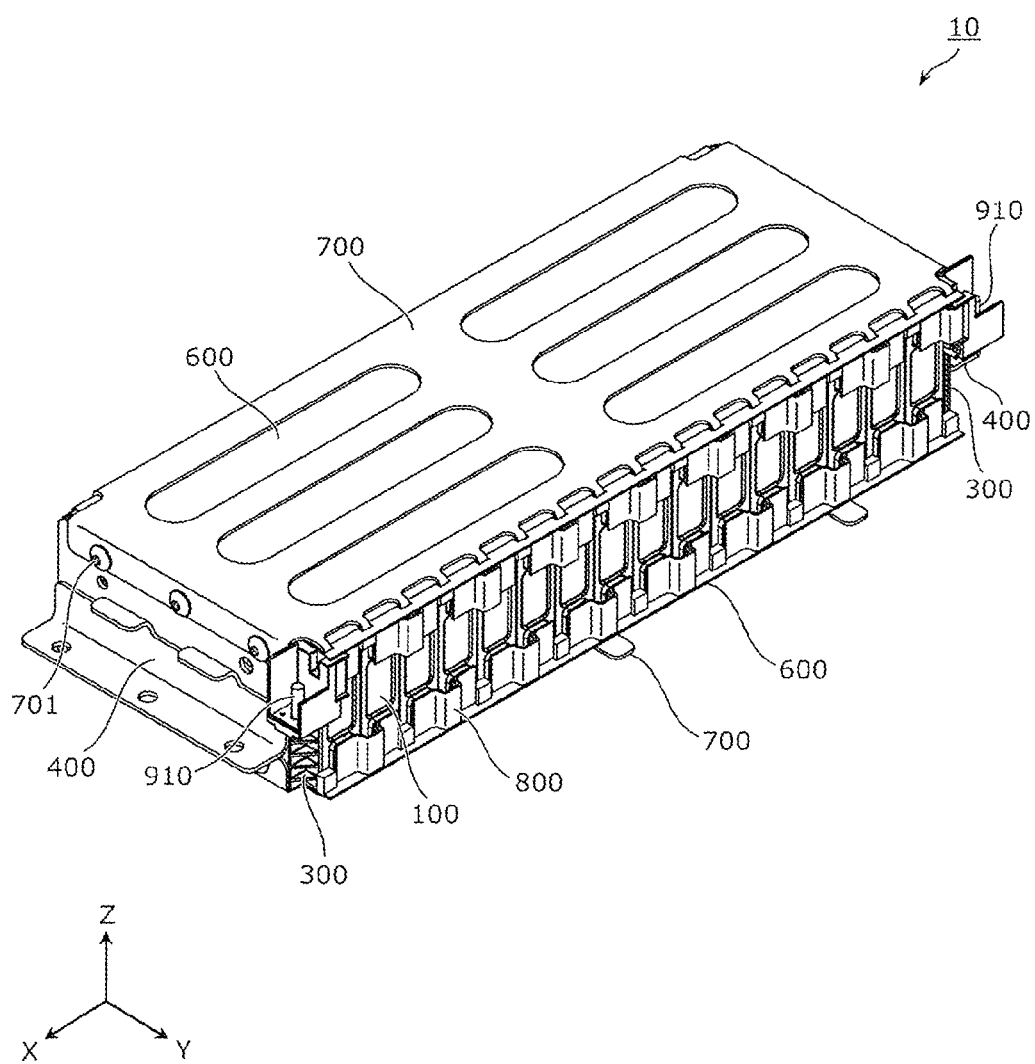
FIG. 1 is a perspective view showing an external appearance of an energy storage apparatus according to an embodiment.

In the conventional energy storage apparatus as disclosed in Patent Document 1, the movement of the energy storage devices is regulated by pressing the outsides of the electrode terminals of the cases of the energy storage devices with the side members. In the configuration in which the electrode terminal is disposed at the end portion of the case, there may be no space for disposing a side member outside the electrode terminal of the case. Even if the electrode terminal is not placed at the end portion of the case, there may be a case in which a space for placing a side member outside the electrode terminal of the case cannot be sufficiently secured or a case in which it is not desired to place a side member outside the electrode terminal of the case due to design convenience or the like. As described above, in the energy storage apparatus having the conventional configuration as described above, it is not possible to sufficiently secure a space for restricting the movement of the energy storage devices by the side members. This sometimes makes it difficult to regulate the movement of energy storage devices.

An energy storage apparatus according to one aspect of the present invention includes a plurality of energy storage devices arranged in a first direction and having electrode terminals on one side in a second direction intersecting the first direction and a side member arranged on sides of the plurality of energy storage devices in a third direction intersecting the first direction and the second direction. The side member has a first protruding portion protruding in a direction opposite to the third direction and being arranged on the one side in the second direction of a first energy storage device among the plurality of energy storage devices and on the one side in the first direction of an electrode terminal of the first energy storage device.

According to this aspect, the energy storage apparatus includes a plurality of energy storage devices arranged in a row in a first direction and a side member arranged on a third direction side of the plurality of energy storage devices. The side member includes a first protruding portion protruding to a side opposite to the third direction and being arranged on the first direction side of the electrode terminal which the first energy storage device includes. As described above, by disposing the first protruding portion of the side member on the first direction side of the electrode terminal, the movement of the first energy storage device can be regulated without disposing the side member on the third direction side of the electrode terminal. Accordingly, the movement of the first energy storage device can be easily regulated.

The side member may further include a second protruding portion protruding in a direction opposite to the third direction and being arranged on the one side of the first energy storage devices in the second direction and on the other side of the electrode terminal of the first energy storage device in the first direction.

With such a configuration, the side member includes the second protruding portion protruding toward the side opposite to the third direction and being arranged on the side opposite to the first direction of the electrode terminal which the first energy storage device includes. As described above, by disposing the second protruding portion of the side member on a side opposite to the first direction of the electrode terminal, the movement of the first energy storage device can be regulated on both sides of the electrode terminal in the first direction. Accordingly, the movement of the first energy storage device can be stably regulated.

The plurality of energy storage devices may further include a second energy storage device adjacent to the first energy storage device in the first direction, and the first protruding portion may be arranged across the first energy storage device and the second energy storage device as viewed in the second direction.

With such a configuration, the first protruding portion of the side member is arranged across the first energy storage device and the second energy storage device. In this manner, the first protruding portion of the side member is disposed across the two energy storage device and hence, the movement of the two energy storage devices can be regulated by one protruding portion. Accordingly, the movement of the two energy storage devices can be easily regulated.

The energy storage apparatus may further include an insulating member disposed between the first energy storage device and the first protruding portion.

With such a configuration, an insulating member is disposed between the first energy storage device and the first protruding portion of the side member. With such a configuration, even when the first protruding portion is formed of a conductive member, it is possible to ensure insulation between the first energy storage device and the first protruding portion. In this manner, the movement of the first energy storage device can be easily regulated while the insulation property is ensured.

The energy storage apparatus may further include an insulating plate disposed between the plurality of energy storage devices and the side member, and the insulating member may be provided on the insulating plate.

With such a configuration, the insulating member disposed between the first energy storage device and the first protruding portion of the side member is disposed on the insulating plate disposed between the plurality of energy storage devices and the side member. That is, in order to ensure insulation between the plurality of energy storage devices and the side member, an insulating plate is disposed between the plurality of energy storage devices and the side member, and the insulating member is formed on the insulating plate. With such a configuration, the insulating member can be easily formed and hence, movement of the first energy storage device can be easily regulated while an insulating property is ensured between the first energy storage device and the first protruding portion.

The first protruding portion may be disposed in a recess portion formed in the insulating member.

With such a configuration, the first protruding portion of the side member is disposed in the recess portion formed in the insulating member. Accordingly, the movement of the first protruding portion can be regulated by disposing the first protruding portion in the recess portion of the insulating member. With such a configuration, the movement of the first protruding portion which regulates the movement of the first energy storage device is regulated, and hence the movement of the first energy storage device can be further regulated.

An energy storage apparatus according to an embodiment of the present invention (and its modification) will be described below with reference to the accompanying drawings. The embodiment described below shows a comprehensive or specific example. Numerical values, shapes, materials, constituent elements, placement positions and connection modes of the constituent elements, manufacturing processes, the order of the manufacturing processes, and the like presented in the following embodiment are merely examples, and are not intended to limit the present invention. Among the constituent elements in the following embodiment, constituent elements that are not described in independent claims indicating the highest concept are described as optional constituent elements. In each drawing, dimensions and the like are not strictly shown.

In the following description and drawings, the arrangement direction of the energy storage devices, the arrangement direction of the spacers (intermediate spacers and end spacers), the arrangement direction of the end members (end plates), the arrangement direction of the energy storage devices, the spacers, and the end members, the opposing direction of a pair of long side surfaces in the case of one energy storage device, or the thickness direction of the energy storage device, the spacers, or the end members is defined as an X-axis direction. The arrangement direction of the case body and the lid of the energy storage device or the arrangement direction of the energy storage device and the bus bar is defined as a Y-axis direction. The arrangement direction of a pair of electrode terminals in one energy storage device, the opposing direction of a pair of short side surfaces of the case of one energy storage device, the arrangement direction of side members (side plates), the arrangement direction of the insulating plates, the arrangement direction of the side members and the insulating plates, or the vertical direction is defined as a Z-axis direction. The X-axis direction, the Y-axis direction, and the Z-axis direction are directions intersecting (orthogonal in this embodiment) each other. Although the Z-axis direction may not be the vertical direction depending on the usage mode, the Z-axis direction will be described below as the vertical direction for convenience of description. In the following description, an X-axis plus direction indicates the arrow direction of the X axis, and an X-axis minus direction indicates a direction opposite to the X-axis plus direction. The same applies to the Y-axis direction and the Z-axis direction.

(Embodiment)

[1 General Description of Energy Storage Apparatus 10]

Figure 2:
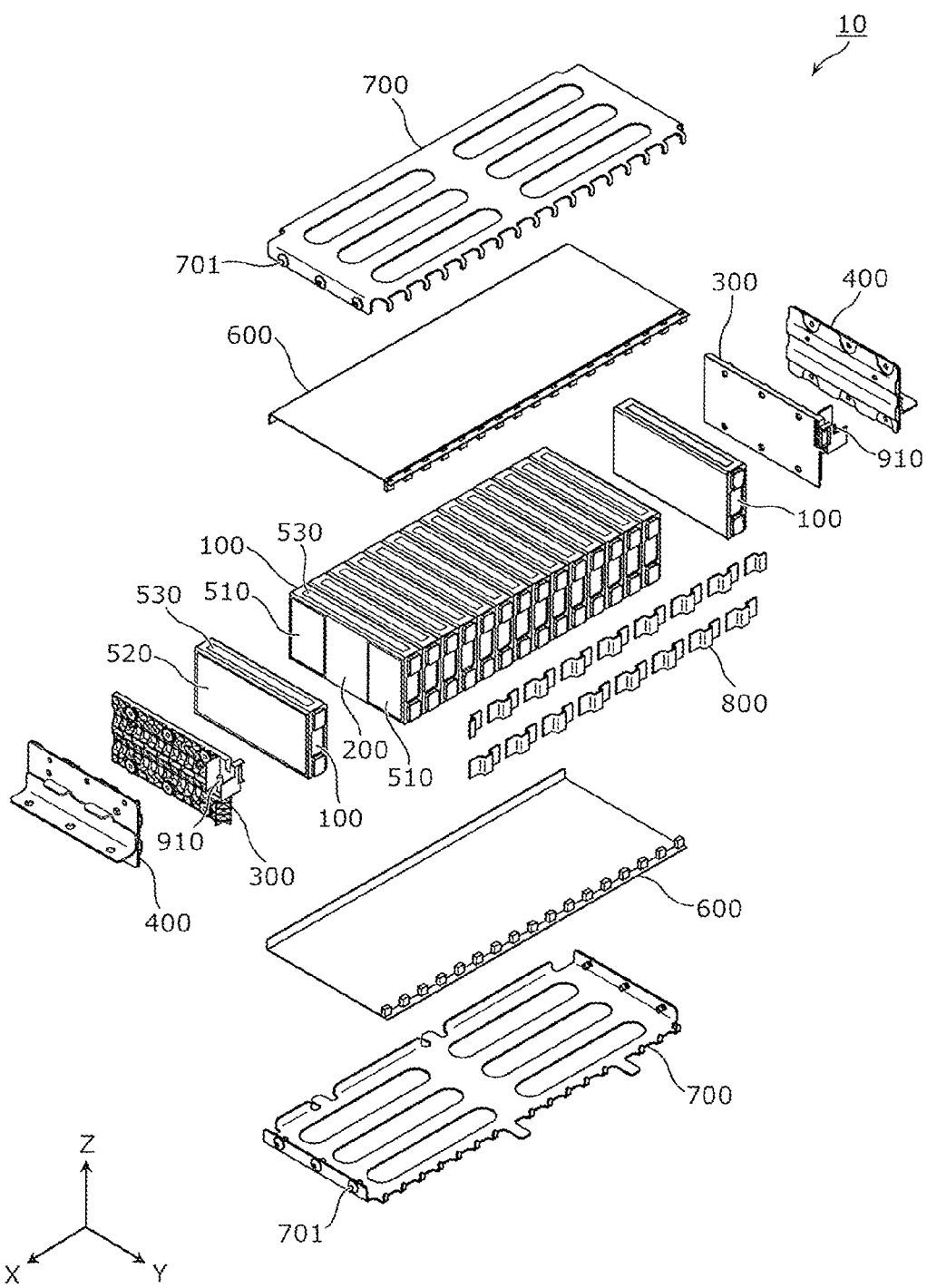
FIG. 2 is an exploded perspective view showing each constituent element when the energy storage apparatus according to the embodiment is disassembled.

The configuration of an energy storage apparatus 10 will be described first. FIG. 1 is a perspective view showing an external appearance of the energy storage apparatus 10 according to this embodiment. FIG. 2 is an exploded perspective view showing each constituent element when the energy storage apparatus 10 according to this embodiment is disassembled.

The energy storage apparatus 10 is an apparatus capable of charging electricity from the outside and discharging electricity to the outside, and has a substantially rectangular parallelepiped shape in this embodiment. The energy storage apparatus 10 is a battery module (assembled battery) used for power storage applications, power supply applications, and the like. Specifically, the energy storage apparatus 10 is used as, for example, a stationary battery for driving or starting the engine of a moving body such as an automobile such as an electric vehicle (EV), a hybrid electric vehicle (HEV), or a plug-in hybrid electric vehicle (PHEV), a motorcycle, a watercraft, a snowmobile, an agricultural machine, a construction machine, or a railway vehicle for an electric railway such as a train, a monorail, or a linear motor car, or for home use or a generator.

As shown in FIGS. 1 and 2, the energy storage apparatus 10 includes a plurality of (16 in this embodiment) energy storage devices 100, a plurality of (15 in the embodiment) intermediate spacers 200, a pair of end spacers 300, a pair of end members 400, a pair of insulating plates 600, a pair of side members 700, and bus bars 800. An adhesive layer 510 is disposed between the adjacent energy storage devices 100, an adhesive layer 520 is disposed between the energy storage device 100 and the end spacer 300, and an adhesive layer 530 is disposed between the energy storage device 100 and the insulating plate 600. On the end spacers 300, a pair of external terminals 910 (a positive electrode external terminal and a negative electrode external terminal) which are the terminals of the energy storage apparatus 10 are arranged. The energy storage apparatus 10 may also include a bus bar frame for holding the bus bars 800, wiring for voltage measurement of the energy storage devices 100, wiring for temperature measurement, a thermistor, a circuit board for monitoring a charged state or a discharged state of the energy storage devices 100, and electric equipment such as a relay.

The energy storage device 100 is a secondary battery (single battery) capable of charging and discharging electricity, and more specifically, is a nonaqueous electrolyte secondary battery such as a lithium ion secondary battery. The energy storage devices 100 have a flat rectangular parallelepiped (prismatic) shape and are arranged side by side in the X axis direction while long side surfaces face in the X axis direction and the electrode terminals face in the Y axis plus direction. The energy storage device 100 is disposed adjacent to the intermediate spacer 200 or the end spacer 300. That is, each of the plurality of energy storage devices 100 is alternately disposed with a corresponding one of the plurality of intermediate spacers 200 and a corresponding one of the pair of end spacers 300, and is arranged in the X axis direction. In this embodiment, the fifteen intermediate spacers 200 are arranged between the adjacent energy storage devices 100 out of the sixteen energy storage devices 100, and a pair of end spacers 300 are arranged at positions sandwiching the energy storage devices 100 arranged at an end portion of the sixteen energy storage devices 100. The configuration of the energy storage device 100 will be described in detail later.

The number of energy storage devices 100 is not particularly limited, and may be plural other than 16. The shape of the energy storage device 100 is not particularly limited and may be any shape such as a polygonal columnar shape other than a rectangular parallelepiped shape, a cylindrical shape, an elliptical columnar shape, or an elliptical columnar shape, or may be a laminate type energy storage device. The energy storage device 100 is not limited to a nonaqueous electrolyte secondary battery and may be a secondary battery other than the nonaqueous electrolyte secondary battery, or may be a capacitor. The energy storage device 100 may be not a secondary battery but a primary battery that allows the user to use stored electricity without charged electricity. The energy storage device 100 may be a battery using a solid electrolyte.

The intermediate spacer 200 and the end spacer 300 are spacers which are arranged on a side (in the X-axis plus direction or the X-axis minus direction) of the energy storage device 100, insulate the energy storage device 100 from other members, and suppress the expansion of the energy storage device 100. The intermediate spacer 200 and the end spacer 300 are formed of an insulating resin material such as polycarbonate (PC), polypropylene (PP), polyethylene (PE), a polyphenylene sulfide resin (PPS), polyethylene terephthalate (PET), polyether ether ketone (PEEK), tetrafluoroethylene-perfluoroalkyl vinyl ether (PFA), polytetrafluoroethylene (PTFE), polybutylene terephthalate (PBT), polyether sulfone (PES), an ABS resin, or a composite material thereof. The intermediate spacer 200 and the end spacer 300 may be formed of a material other than resin as long as it has insulating properties, and may be formed of a ceramic, a mica plate formed of a dammar material formed by stacking and bonding mica pieces or the like. All of the plurality of intermediate spacers 200 and the pair of end spacers 300 may not be formed of the same material.

The intermediate spacer 200 is a rectangular flat-plate-like spacer disposed at a center position in the Y axis direction of the energy storage device 100 between the two adjacent energy storage devices 100. The adhesive layers 510 such as double-sided tapes are arranged on both sides of the intermediate spacer 200 in the Y axis direction, and the energy storage devices 100 on both sides of the intermediate spacer 200 in the X axis direction are made to adhere to each other by the adhesive layers 510. With such a configuration, the intermediate spacer 200 is fixed to the energy storage devices 100 arranged on both sides in the X-axis direction by being sandwiched between the energy storage devices 100 arranged on both sides in the X-axis direction. In this embodiment, fifteen intermediate spacers 200 are arranged in correspondence with sixteen energy storage devices 100. However, when the number of energy storage devices 100 is other than 16, the number of intermediate spacers 200 is also changed in accordance with the number of energy storage devices 100.

The end spacer 300 is a rectangular plate-like spacer disposed between the energy storage device 100 at the end portion and the end member 400. The adhesive layer 520 such as a double-sided tape is disposed on the energy storage device 100 side of the end spacer 300, and the end spacer 300 and the energy storage device 100 are made to adhere to each other by the adhesive layer 520.

The end member 400 and the side member 700 press the energy storage devices 100 from the outside in the direction in which the plurality of energy storage devices 100 are arranged (X-axis direction). That is, the end members 400 and the side members 700 press the respective energy storage devices 100 included in the plurality of energy storage devices 100 from both sides in the arrangement direction by sandwiching the plurality of energy storage devices 100 from both sides in the arrangement direction.

More specifically, the end members 400 are plate-like end plates (sandwiching members) which are arranged on both sides in the X axis direction of the plurality of energy storage devices 100 and sandwich and hold the plurality of energy storage devices 100 from both sides in the arrangement direction (X-axis direction) of the plurality of energy storage devices 100. The end member 400 is made of a metal (conductive) material such as stainless steel, iron, a plated steel plate, aluminum, or an aluminum alloy from a viewpoint of securing strength. A material for the end member 400 is not particularly limited. The end member 400 may be formed of an insulating material having high strength and may be subjected to an insulation treatment. The end member 400 may be a block-shaped end block or the like instead of a plate-shaped end plate.

The side member 700 is an elongated plate-like side plate (a restraint member or restraint bar) which has both ends attached to the end member 400 and binds the plurality of energy storage devices 100. That is, the side member 700 extends in the X axis direction across the plurality of energy storage devices 100, the plurality of intermediate spacers 200, and the pair of end spacers 300 and applies a binding force in the arrangement direction (X-axis direction) to the plurality of energy storage devices 100 and the like. In this embodiment, on both sides of the plurality of energy storage devices 100 in the Z-axis direction, the two side members 700 are arranged at positions sandwiching the insulating plates 600 with the energy storage devices 100. The two side members 700 are respectively attached to the Z-axis direction end portions of the two end members 400 at both end portions in the X-axis direction. With such a configuration, the two side members 700 sandwich and restrain the plurality of energy storage devices 100 and the like from both sides in the X-axis direction and both sides in the Z-axis direction.

The side member 700 is fixed to the end member 400 with a plurality of fixing members 701 such as bolts arranged in the Y-axis direction. The attachment of the side member 700 to the end member 400 is not limited to fixing with bolts or the like, and may be fixed (joined) by welding, adhesion, riveting, caulking, or the like. The side member 700 may be formed of any material, but is formed of a material similar to the end member 400 from the viewpoint of securing strength and the like. The configuration of the side member 700 will be described in detail later.

The insulating plates 600 are elongated flat-plate-like insulating members (insulators) which are arranged on both sides of the plurality of energy storage devices 100 in the Z-axis direction and extend in the X-axis direction. That is, the insulating plate 600 is disposed between the plurality of energy storage devices 100 and the side members 700 so as to straddle the plurality of energy storage devices 100, the plurality of intermediate spacers 200, and the pair of end spacers 300, and insulates the energy storage devices 100 from the side member 700. The insulating plate 600 is a member having higher elasticity (low Young's modulus or low stiffness) than the side member 700. The adhesive layer 530 such as a double-sided tape is disposed between the energy storage device 100 and the insulating plate 600, and the energy storage device 100 and the insulating plate 600 are made to adhere to each other by the adhesive layer 530. The insulating plate 600 may be made of any material as long as it is a member having an insulating property, but is made of a material similar to the material for the intermediate spacer 200 and the end spacer 300. The two insulating plates 600 may be made of different materials. The configuration of the insulating plate 600 will be described in detail later.

The bus bars 800 are conductive plate-like members which are arranged on the plurality of energy storage devices 100 and electrically connect the electrode terminals of the plurality of energy storage devices 100 to each other. In this embodiment, the bus bars 800 connect the positive electrode terminals and the negative electrode terminals of the adjacent energy storage devices 100 in order to connect the plurality of energy storage devices 100 in series. The external terminals 910 on the positive electrode side and the negative electrode side are connected to the bus bar 800 disposed at the end. The bus bar 800 is formed of a conductive member made of metal such as aluminum, an aluminum alloy, copper, or a copper alloy. The connection form of the energy storage devices 100 is not particularly limited, and any of the energy storage devices 100 may be connected in parallel.

[2 Detailed Description of Energy Storage Device 100]

Figure 3:
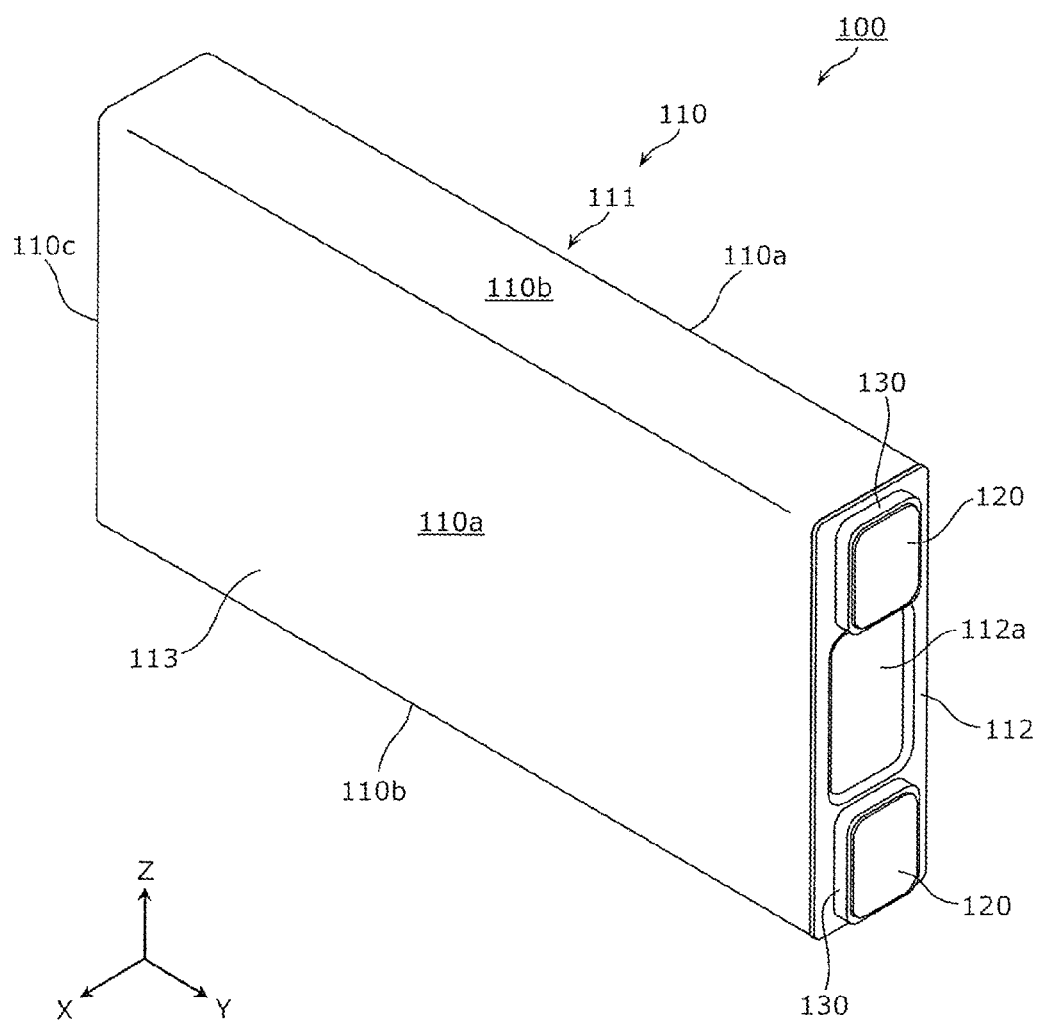
FIG. 3 is a perspective view showing the configuration of an energy storage device according to the embodiment.

The configuration of the energy storage device 100 will be described next in detail. FIG. 3 is a perspective view showing the configuration of the energy storage device 100 according to this embodiment. More specifically, FIG. 3 is an enlarged perspective view showing a state in which the intermediate spacer 200 and the adhesive layers 510, 520 and 530 are removed from the energy storage device 100 in FIG. 2. Since all the sixteen energy storage devices 100 in FIG. 2 have the same configuration, one energy storage device 100 will be described below.

As shown in FIG. 3, the energy storage device 100 includes a case 110, a pair of electrode terminals 120 (a positive electrode terminal and a negative electrode terminal), and a pair of gaskets 130 (gaskets on the positive electrode side and the negative electrode side). Although an electrode assembly, a pair of current collectors (a positive electrode current collector and a negative electrode current collector), an electrolyte (nonaqueous electrolyte) and the like are accommodated in the case 110, these are not shown. The type of electrolyte is not particularly limited as long as it does not impair the performance of the energy storage device 100, and various types of electrolytes can be selected. A gasket is also disposed between the case 110 (a lid body 112 (to be described later)) and the current collector, and a spacer is disposed on a side or the like of the current collector, but illustration thereof is also omitted.

The case 110 is a rectangular parallelepiped (square) case having a case main body 111 in which an opening is formed, a lid body 112 that closes the opening of the case main body 111, and an insulating sheet 113 that covers an outer surface of the case main body 111. The case main body 111 is a rectangular cylindrical member having a bottom and constituting the main body portion of the case 110, and has an opening on the Y-axis plus direction side. The lid body 112 is a rectangular plate-like member constituting the lid portion of the case 110 and is disposed to extend in the Z-axis direction on the Y-axis plus direction side of the case main body 111. The lid body 112 is provided with a gas release valve 112*a* that releases pressure when the pressure inside the case 110 increases, an electrolyte filling unit (not shown) for filling the case 110 with an electrolyte, and the like. The material for the case main body 111 and the lid body 112 is not particularly limited, but is preferably a weldable metal such as stainless steel, aluminum, an aluminum alloy, iron, or a plated steel plate.

The insulating sheet 113 is an insulating sheet-like member disposed on the outer surface of the case main body 111 and covering the outer surface of the case main body 111. The material for the insulating sheet 113 is not particularly limited as long as it can secure the insulating property required for the energy storage device 100, and examples of such materials include insulating resins such as PC, PP, PE, PPS, PET, PBT, and ABS resins, epoxy resins, Kapton, Teflon (registered trademark), silicon, polyisoprene and polyvinyl chloride.

As described above, the electrode assembly and the like are accommodated inside the case main body 111, the case main body 111 and the lid body 112 are joined by welding or the like to seal the inside, and the insulating sheet 113 is disposed on the outer surface of the case main body 111 to form the case 110. With such a configuration, the case 110 has a pair of long side surface portions 110a on both side surfaces in the X-axis direction, a pair of short side surface portions 110b on both side surfaces in the Z-axis direction, and a bottom surface portion 110c on a Y-axis minus direction side. The long side surface portion 110a is a rectangular flat surface portion forming a long side surface of the case 110, the short side surface portion 110b is a rectangular flat surface portion forming a short side surface of the case 110, and the bottom surface portion 110c is a rectangular flat surface portion forming the bottom surface of the case 110. In this embodiment, the insulating sheet 113 is disposed on all of the pair of long side surface portions 110a, the pair of short side surface portions 110b, and the bottom surface portion 110c, but may not be disposed on some surface portion such as the bottom surface portion 110c.

The electrode terminals 120 are terminals (a positive electrode terminal and a negative electrode terminal) of the energy storage device 100 disposed on the lid body 112 and are electrically connected to the positive electrode plate and the negative electrode plate of the electrode assembly through current collectors. That is, the electrode terminal 120 is a metal member for leading out electricity stored in the electrode assembly to a space outside the energy storage device 100 and for introducing electricity into a space inside the energy storage device 100 for storing electricity in the electrode assembly. The electrode terminal 120 is made of aluminum, an aluminum alloy, copper, a copper alloy, or the like. The gasket 130 is disposed around the electrode terminal 120 and between the electrode terminal 120 and the lid body 112 and is a member for ensuring insulation and airtightness between the electrode terminal 120 and the lid body 112. The gasket 130 is made of an insulating material such as PP, PE, PPS, PET, PEEK, PFA, PTFE, PBT, PES, and ABS resins.

The electrode assembly is an energy storage element (power generating element) formed by stacking a positive electrode plate, a negative electrode plate, and a separator. The positive electrode plate included in the electrode assembly is formed by forming a positive active material layer on a positive electrode substrate layer which is an elongated strip-shaped current collecting foil made of metal such as aluminum or an aluminum alloy. The negative electrode plate is obtained by forming a negative active material layer on a negative electrode substrate layer which is an elongated strip-shaped current collecting foil made of metal such as copper or a copper alloy. As the positive active material used for the positive active material layer and the negative active material used for the negative active material layer, known materials can be appropriately used as long as they can occlude and discharge lithium ions. The current collector is a member having conductivity and rigidity (a positive electrode current collector and a negative electrode current collector) electrically connected to the electrode terminal 120 and the electrode assembly. The positive electrode current collector is formed of aluminum, an aluminum alloy or the like similar to the positive electrode substrate layer of the positive electrode plate, and the negative electrode current collector is formed of copper, a copper alloy or the like similar to the negative electrode substrate layer of the negative electrode plate.

[3 Detailed Description of Insulating Plate 600]

Figure 4:
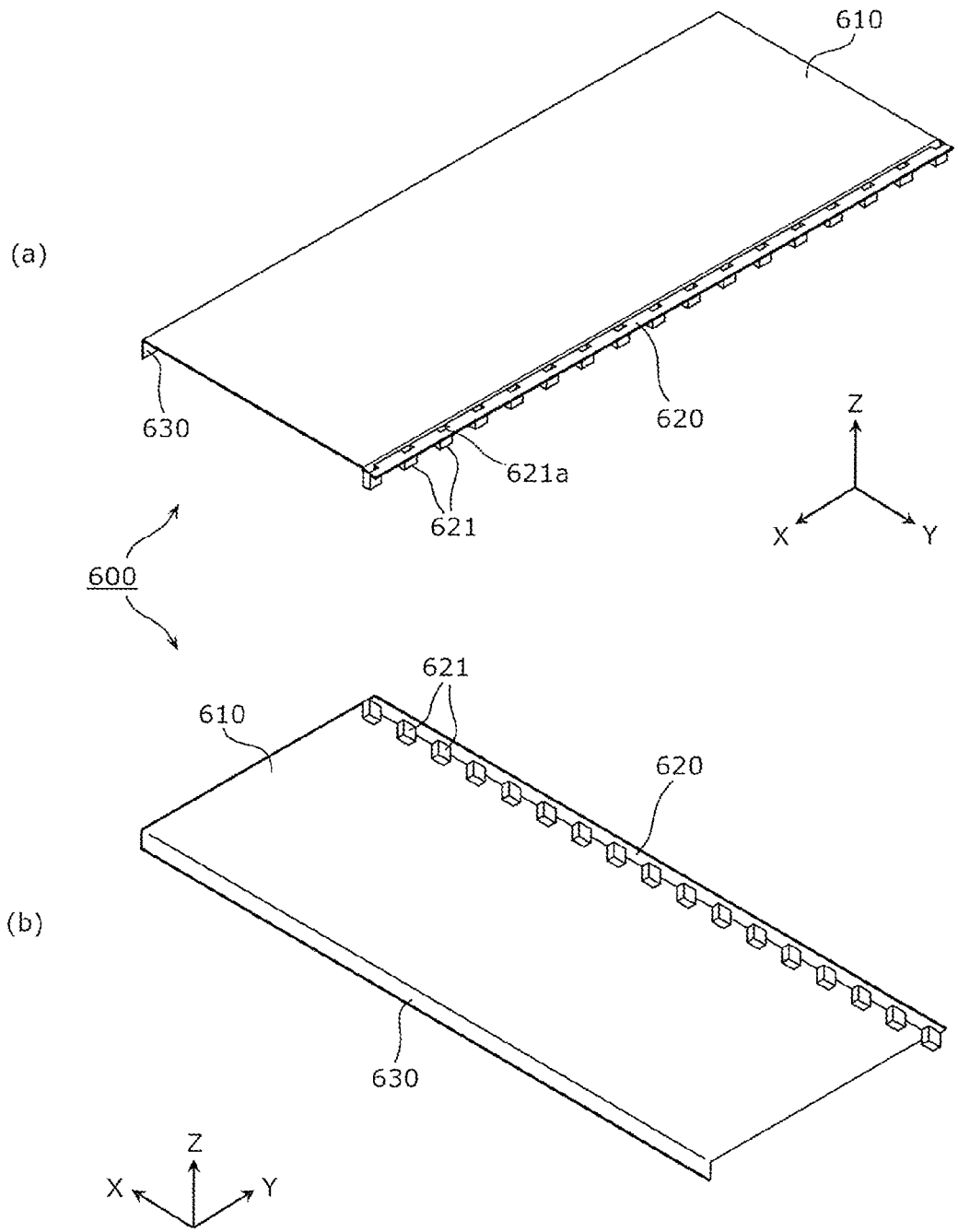
FIG. 4 is a perspective view showing the configuration of an insulating plate according to the embodiment.

The configuration of the insulating plate 600 will be described next in detail. FIG. 4 is a perspective view showing the configuration of the insulating plate 600 according to this embodiment. Specifically, part (a) of FIG. 4 is a perspective view showing the insulating plate 600 on the Z-axis plus direction side in FIG. 2, and part (b) of FIG. 4 is a perspective view showing the configuration of the insulating plate 600 in part (a) of FIG. 4 as viewed from the back side. In FIG. 2, the insulating plate 600 on the Z-axis plus direction side and the insulating plate 600 on the Z-axis minus direction side have the same configuration, and hence a description of the insulating plate 600 on the Z-axis minus direction side is omitted.

As shown in FIG. 4, the insulating plate 600 includes an insulating plate main body portion 610, an insulating plate first wall portion 620, and an insulating plate second wall portion 630. The insulating plate main body portion 610 is a rectangular plate-like portion which is disposed on the Z-axis plus direction side of the energy storage device 100 and is parallel to an XY plane extending in the X-axis direction. The insulating plate first wall portion 620 is an elongated portion which is disposed at an end portion of the insulating plate main body portion 610 on the Y-axis plus direction side and extends in the X-axis direction. The insulating plate second wall portion 630 is an elongated plate-like portion which protrudes toward the Z-axis minus direction side from an end portion of the insulating plate main body portion 610 on the Y-axis minus direction side, and extends in the X-axis direction and is disposed on the Y-axis minus direction side of the energy storage device 100.

The insulating plate first wall portion 620 will be described in more detail. The insulating plate first wall portion 620 has a plurality of insulating plate protruding portions 621 which protrude toward the Z-axis minus direction side and are arranged in the X-axis direction. The insulating plate protruding portion 621 is a rectangular parallelepiped protruding portion which is disposed on the Y axis plus direction side of the energy storage device 100.

The insulating plate protruding portion 621 is formed with a recess portion 621a recessed in the Z-axis minus direction in a surface on the Z-axis plus direction side. The recess portion 621a is a recess portion into which a side member protruding portion 721 of the side member 700 (to be described later) is inserted. That is, by inserting the side member protruding portion 721 into the recess portion 621a of the insulating plate protruding portion 621, a part of the insulating plate protruding portion 621 is disposed between the energy storage device 100 and the side member protruding portion 721 in the Y-axis direction. Accordingly, the insulating plate protruding portion 621 is an example of an insulating member disposed between the energy storage device 100 and the side member protruding portion 721. The placement position of the insulating plate protruding portion 621 will be described in detail later.

[4 Detailed Description of Side Member 700]

Figure 5:
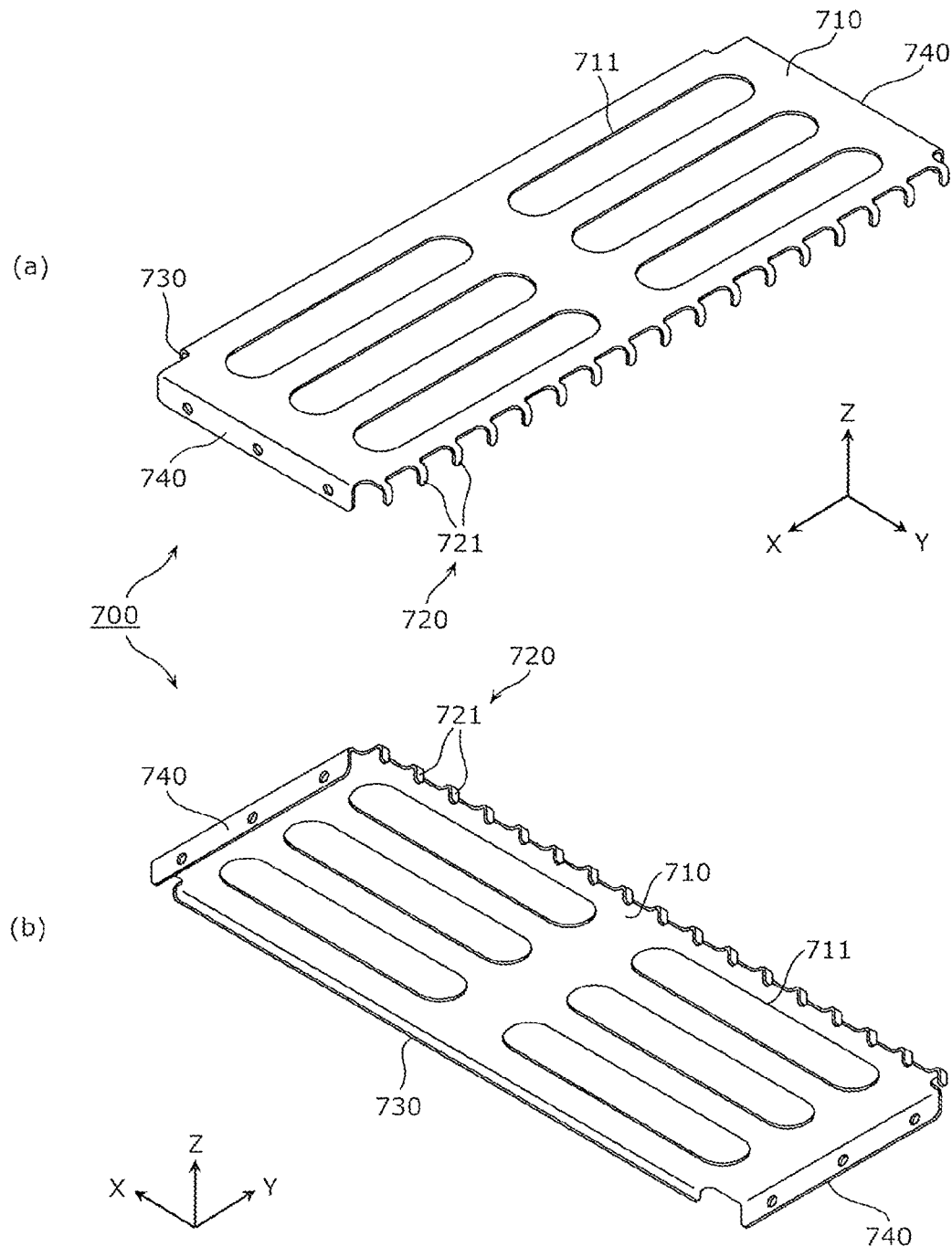
FIG. 5 is a perspective view showing the configuration of side members according to the embodiment.

The configuration of the side member 700 will be described next in detail. FIG. 5 is a perspective view showing the configuration of the side member 700 according to this embodiment. Specifically, part (a) of FIG. 5 is a perspective view showing the side member 700 on the Z-axis plus direction side in FIG. 2, and part (b) of FIG. 5 is a perspective view showing the configuration of the side member 700 in part (a) of FIG. 5 as viewed from the back side. In FIG. 2, the side member 700 on the Z-axis plus direction side and the side member 700 on the Z-axis minus direction side have the same configuration, and hence a description of the side member 700 on the Z-axis minus direction side is omitted.

As shown in FIG. 5, the side member 700 includes a side member main body portion 710, a side member first wall portion 720, a side member second wall portion 730, and a side member third wall portion 740.

The side member main body portion 710 is a rectangular plate-like portion which is disposed on the Z-axis plus direction side of the insulating plate main body portion 610 and is parallel to an XY plane extending in the X-axis direction, and has a plurality of through holes 711 extending in the X-axis direction. The side member first wall portion 720 is a portion disposed at an end portion of the side member main body portion 710 on the Y-axis plus direction side. The side member second wall portion 730 is an elongated plate-like portion which protrudes toward the Z-axis minus direction side from an end portion of the side member main body portion 710 on the Y-axis minus direction side, and extends in the X-axis direction and is disposed on the Y-axis minus direction side of the energy storage device 100. The side member third wall portions 740 are elongated plate-like portions which protrude toward the Z-axis minus direction side from both end portions of the side member main body portion 710 in the X-axis direction and extend in the Y-axis direction, and are fixed to the end members 400.

The side member first wall portion 720 will be described in more detail. The side member first wall portion 720 has a plurality of side member protruding portions 721 which protrude toward the Z-axis minus direction side and are arranged in the X-axis direction. The side member protruding portion 721 is a flat plate-like protruding portion which is disposed on the Y-axis plus direction side of the energy storage device 100. As described above, the side member protruding portion 721 is inserted into the recess portion 621a formed in the insulating plate protruding portion 621 of the insulating plate 600 and is disposed in the recess portion 621a. The placement positions of the side member protruding portions 721 will be described in detail later.

[5 Description of Placement Positions of Insulating Plate 600 and Side Member 700]

Figure 6:
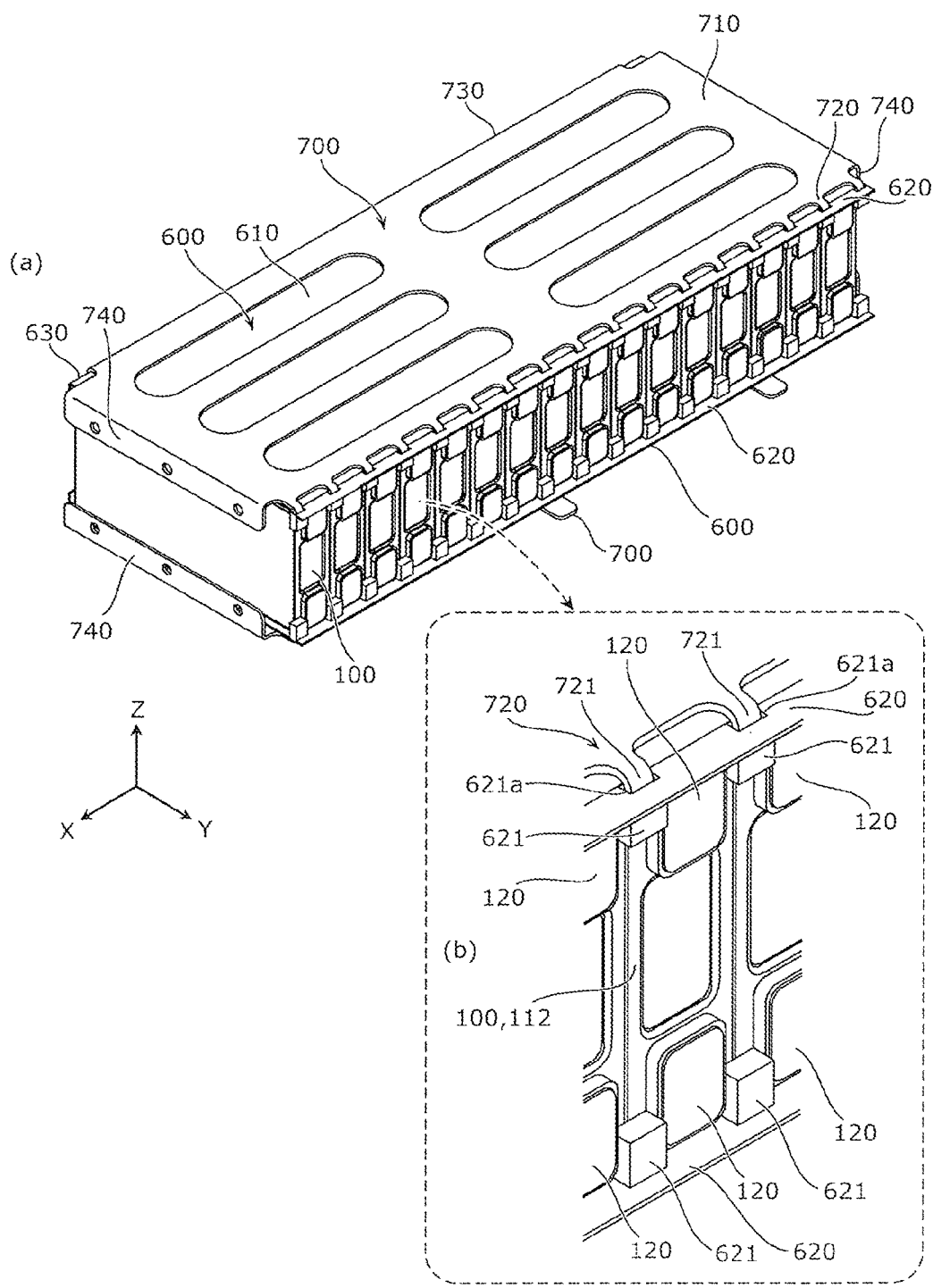
FIG. 6 is a perspective view showing the placement positions of an insulating plate and side members according to the exemplary embodiment.
Figure 7:
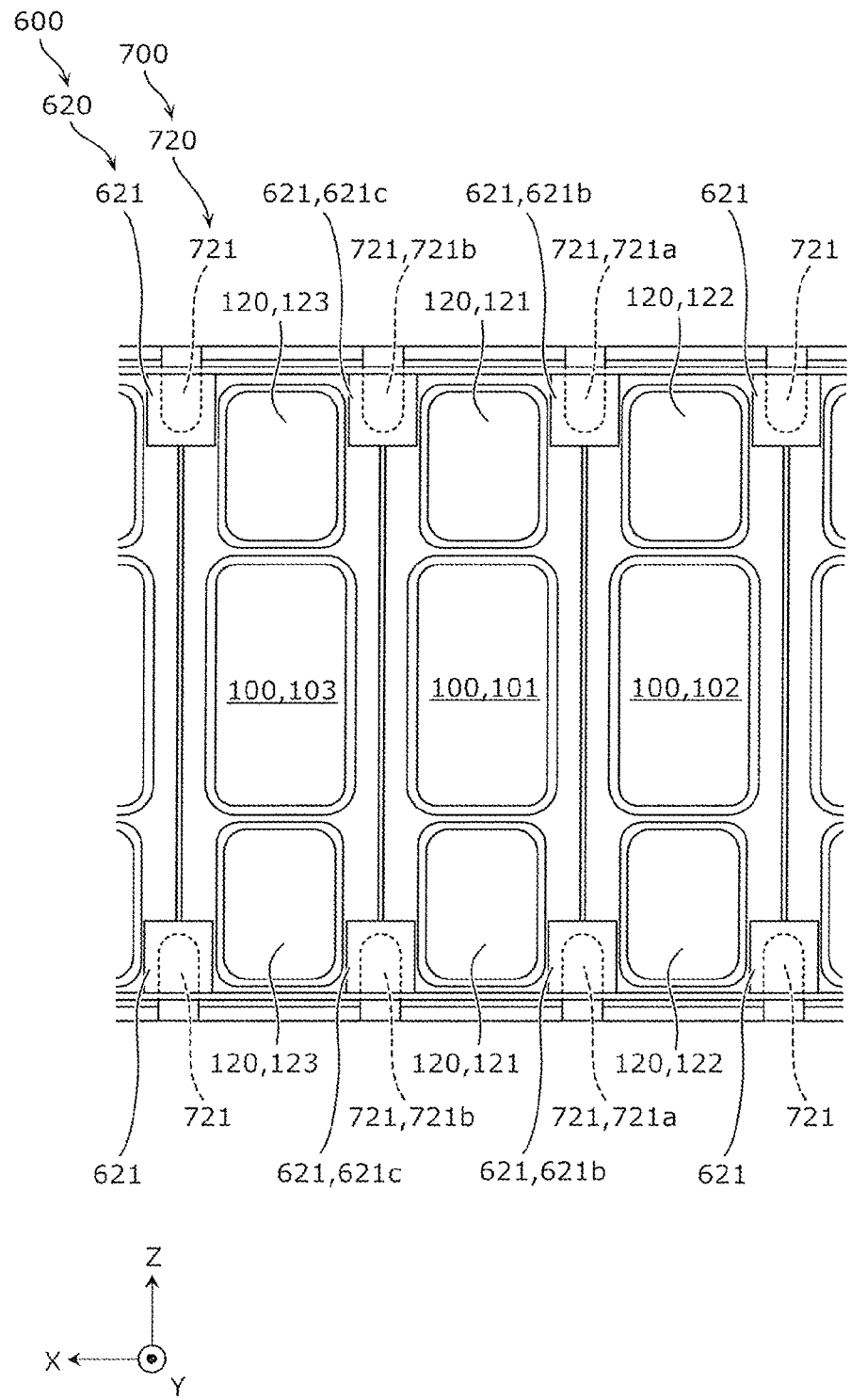
FIG. 7 is a plan view showing the placement positions of an insulating plate and side members according to the embodiment.

The placement positions of the insulating plate 600 and the side member 700 will be described next in detail. FIG. 6 is a perspective view showing the placement positions of the insulating plates 600 and the side members 700 according to this embodiment. More specifically, part (a) of FIG. 6 is a perspective view showing the configuration in which the insulating plates 600 and the side members 700 are mounted on the plurality of energy storage devices 100, and part (b) of FIG. 6 is an enlarged perspective view showing a surface on the Y-axis plus direction side in the configuration shown in part (a) of FIG. 6 in an enlarged manner. FIG. 7 is a plan view showing the placement positions of the insulating plates 600 and the side members 700 according to the embodiment. Specifically, FIG. 7 is an enlarged plan view showing a part of the configuration in part (a) of FIG. 6 as viewed from the Y-axis plus direction.

Hereinafter, the X-axis minus direction is also referred to as the first direction, and the Y-axis plus direction is also referred to as the second direction. The Z-axis plus direction or the Z-axis minus direction which is a direction in which the insulating plates 600 and the side members 700 are arranged with respect to the plurality of energy storage devices 100 is also referred to as the third direction. That is, the Z-axis plus direction is the third direction when the insulating plates 600 and the side members 700 on the Z-axis plus direction side are described, and the Z-axis minus direction is the third direction when the insulating plates 600 and the side members 700 on the Z-axis minus direction side are described. As described above, the plurality of energy storage devices 100 are arranged in the first direction and have the electrode terminals 120 on the second direction side. The insulating plates 600 and the side members 700 are arranged on the third direction side of the plurality of energy storage devices 100.

As shown in FIG. 6, the insulating plate protruding portions 621 protrude toward a side opposite to the third direction and are arranged on the second direction side of the energy storage devices 100 and on the X-axis direction side of the electrode terminals 120 of the energy storage devices 100. The side member protruding portion 721 protrudes to the side opposite to the third direction and is disposed in the recess portion 621a formed in the insulating plate protruding portion 621. With such a configuration, the side member protruding portion 721 is disposed on the second direction side of the energy storage device 100 and on the X-axis direction side of the electrode terminal 120 which the energy storage device 100 includes. With such a configuration, the insulating plate protruding portion 621 and the side member protruding portion 721 press the energy storage device 100 toward a side opposite to the second direction. The insulating plate protruding portion 621 and the side member protruding portion 721 do not necessarily press the energy storage device 100.

As shown in FIG. 7, one energy storage device 100 out of the plurality of energy storage devices 100 is defined as a first energy storage device 101, the other energy storage device 100 disposed on the first direction side of the first energy storage device 101 is defined as a second energy storage device 102, and the other energy storage device 100 disposed on a side opposite to the first direction of the first energy storage device 101 is defined as a third energy storage device 103. The electrode terminal 120 of the first energy storage device 101 is referred to as a first electrode terminal 121, the electrode terminal 120 of the second energy storage device 102 is referred to as a second electrode terminal 122, and the electrode terminal 120 of the third energy storage device 103 is referred to as a third electrode terminal 123.

The insulating plate protruding portion 621 disposed on the first direction side of the first electrode terminal 121 is defined as a first insulating plate protruding portion 621b, and the insulating plate protruding portion 621 disposed on the opposite side of the first electrode terminal 121 to the first direction is defined as a second insulating plate protruding portion 621c. The side member protruding portion 721 disposed on the first direction side of the first electrode terminal 121 is referred to as a first side member protruding portion 721a, and the side member protruding portion 721 disposed on the side opposite of the first electrode terminal 121 to the first direction is referred to as a second side member protruding portion 721b. The first side member protruding portion 721a is an example of a first protruding portion, and the second side member protruding portion 721b is an example of a second protruding portion.

With such a configuration, the first insulating plate protruding portion 621b and the first side member protruding portion 721a protrude toward the side opposite to the third direction and are arranged on the second direction side of the first energy storage device 101 and on the first direction side of the first electrode terminal 121 which the first energy storage device 101 includes. The second insulating plate protruding portion 621c and the second side member protruding portion 721b protrude toward the side opposite to the third direction and are arranged on the second direction side of the first energy storage device 101 and on the side opposite to the first direction of the first electrode terminal 121. That is, the first insulating plate protruding portion 621*b* and the second insulating plate protruding portion 621*c* are arranged so as to protrude to positions sandwiching the first electrode terminal 121 in the first direction. Similarly, the first side member protruding portions 721*a* and the second side member protruding portions 721*b* are arranged so as to protrude to positions sandwiching the first electrode terminals 121 in the first direction.

The first insulating plate protruding portion 621*b* and the first side member protruding portion 721*a* are arranged on the second direction side of the first energy storage device 101 and the second energy storage device 102 across the first energy storage device 101 and the second energy storage device 102. Likewise, the second insulating plate protruding portion 621*c* and the second side member protruding portion 721*b* are arranged on the second direction side of the first energy storage device 101 and the third energy storage device 103 across the first energy storage device 101 and the third energy storage device 103. That is, the first insulating plate protruding portion 621*b* and the first side member protruding portion 721*a* are arranged between the first electrode terminal 121 and the second electrode terminal 122, and the second insulating plate protruding portion 621*c* and the second side member protruding portion 721*b* are arranged between the first electrode terminal 121 and the third electrode terminal 123.

The above configuration remains the same on both the Z-axis plus direction side and the Z-axis minus direction side. That is, the two first insulating plate protruding portions 621*b* and the two first side member protruding portions 721*a* on the Z-axis plus direction side and the Z-axis minus direction side are arranged on the Z-axis plus direction side and the Z-axis minus direction side of the first energy storage device 101 and the second energy storage device 102. The same applies to the second insulating plate protruding portion 621*c* and the second side member protruding portion 721*b*.

[6 Description of Effects]

As described above, the energy storage apparatus 10 according to this embodiment includes the plurality of energy storage devices 100 arranged in the first direction and the side members 700 arranged on the third direction side of the plurality of energy storage devices 100. The side member 700 has the side member protruding portions 721 (first side member protruding portions 721*a* and the like) which protrude toward a side opposite to the third direction and are arranged on a first direction side of the electrode terminal 120 of the energy storage device 100. As described above, by disposing the protruding portions 721 of the side member on the first direction side of the electrode terminals 120, the movement of the energy storage devices 100 can be regulated without disposing the side member 700 on the third direction side of the electrode terminals 120. Accordingly, the movement of the energy storage devices 100 can be easily regulated.

This will be described in more detail below. The energy storage device 100 is sometimes designed with little consideration for circumstances concerning the design of the energy storage apparatus 10 in order to achieve higher output, higher energy density, and the like. In order to increase the output, it is advantageous to shorten the current collector and connect the current collector to the electrode terminal 120, so that the electrode terminal 120 tends to approach both ends of the lid body 112 of the case 110. In order to increase the area of the electrode assembly by increasing the energy density, it is sometimes advantageous to dispose the electrode terminal 120 on the surface of the case 110 which is smaller in area. In this case, since the occupancy of the electrode terminals 120 with respect to the surface increases, the electrode terminals 120 tend to approach both ends of the surface. This makes it impossible to hold the outside (the third direction side) of the electrode terminal 120 as in the conventional case, and hence the side member protruding portions 721 are provided and arranged on the first direction side of the electrode terminals 120. Accordingly, the movement of the energy storage devices 100 can be easily regulated.

In the case in which the side member protruding portions 721 are arranged on the outer side (third direction side) of the electrode terminals 120, when the side member protruding portions 721 are excessively long, the side member protruding portions interfere with the electrode terminals 120, whereas when the side member protruding portions are excessively short, the movement of the energy storage devices 100 cannot be sufficiently regulated. For this reason, accuracy is required for the protruding dimension of the side member protruding portion 721. On the other hand, in the configuration in which the side member protruding portion 721 is disposed on the first direction side of the electrode terminal 120 as in this embodiment, there is no member that becomes an obstacle in the protruding direction of the side member protruding portion 721. Therefore, the protruding dimension of the side member protruding portion 721 can be arbitrarily set according to the required holding force, rigidity, and the like.

The side member 700 has the side member protruding portions 721 (second side member protruding portions 721*b* and the like) which protrude toward a side opposite to the third direction and are arranged on a side opposite to the first direction of the electrode terminal 120 of the energy storage device 100. As described above, by disposing the protruding portions 721 of the side member on a side opposite to the first direction of the electrode terminals 120, the movement of the energy storage devices 100 can be regulated on both sides of the electrode terminals 120 in the first direction. That is, when the side member protruding portions 721 are arranged only on one side of the electrode terminals 120 in the first direction, the movement to the other side cannot be regulated. In this case, when the energy storage device 100 pushes up the side member protruding portions 721 due to vibration, impact, or the like, the other side of the energy storage device 100 tends to be inclined to move, and a force for twisting the bus bars 800 is generated, which may lead to disconnection. Therefore, by sandwiching both sides of each electrode terminal 120 in the first direction, the movement of the energy storage device 100 is regulated in a well-balanced manner, and it is possible to prevent adverse effects on other portions constituting the energy storage apparatus 10 such as the bus bars 800. In this manner, the movement of the energy storage device 100 can be easily and stably regulated.

The side member protruding portions 721 are arranged across the two energy storage devices 100 (the first energy storage device 101, the second energy storage device 102, and the like). More specifically, the side member protruding portions 721 are arranged between the two electrode terminals 120 of the two energy storage devices 100 across the two energy storage devices 100. In this manner, the side member protruding portions 721 are arranged across the two energy storage devices 100 and, hence the movement of the two energy storage devices 100 can be regulated by one side member protruding portion 721. Accordingly, the movement of the two energy storage devices 100 can be easily regulated.

A part of the insulating plate protruding portion 621 is disposed between the energy storage device 100 and the side member protruding portion 721. With such a configuration, even when the side member protruding portions 721 are formed of a conductive member, it is possible to ensure insulation between the energy storage device 100 and the side member protruding portions 721. In this manner, the movement of the energy storage device 100 can be easily regulated while the insulation property is ensured.

This will be described in more detail below. In the configuration in which the side member protruding portion 721 is disposed outside the electrode terminal 120 as in the related art, the side member protruding portion 721 hardly interferes with the electrode terminal 120, and hence not much consideration is given to insulation between the side member protruding portion 721 and the electrode terminal 120. However, in this embodiment, the side member protruding portion 721 is disposed between the two electrode terminals 120. Accordingly, it is necessary to consider a possibility that the side member protruding portion 721 comes into contact with the electrode terminal 120 and is short-circuited at the time of assembly. For this reason, a part of the insulating plate protruding portion 621 is disposed between the energy storage device 100 and the side member protruding portion 721. As a result, it is possible to prevent the side member protruding portion 721 from coming into contact with the electrode terminal 120 and short-circuiting at the time of assembly, and hence it is possible to more safely perform the assembly work.

Since the side member 700 is a metal member and the insulating plate protruding portion 621 is a resin member, the side member protruding portion 721 is formed on the side member 700 to form the side member protruding portion 721 having high strength, and the energy storage device 100 can be protected by the relatively soft insulating plate protruding portion 621. With such a configuration, it is possible to easily regulate the movement of the energy storage device 100 while the energy storage device 100 is protected with high strength.

The insulating plate protruding portions 621 are provided on the insulating plate 600 disposed between the plurality of energy storage devices 100 and the side member 700. That is, in order to ensure insulation between the plurality of energy storage devices 100 and the side members 700, the insulating plate 600 is disposed between the plurality of energy storage devices 100 and the side members 700, and the insulating plate protruding portion 621 is formed on the insulating plate 600. With such a configuration, the insulating plate protruding portion 621 can be easily formed, and hence movement of the energy storage device 100 can be easily regulated while an insulation property is ensured between the energy storage device 100 and the side member protruding portion 721. Since the insulating plate protruding portion 621 is provided on the insulating plate 600, the insulating plate protruding portion 621 and the other portion are continuous on the insulating plate 600, and a gap is not generated between the two portions. This can improve the insulation.

Since the insulating plate protruding portions 621 are provided on the insulating plate 600, they can be handled integrally. At the time of assembling work, the side member 700 may be attached after the insulating plate 600 is attached to the plurality of energy storage devices 100 in advance, or the side member 700 and the insulating plate 600 may be assembled in advance and then attached to the plurality of energy storage devices 100. In either method, assembling workability is good, and it is possible to prevent the side member protruding portion 721 from coming into contact with the electrode terminal 120 and short-circuiting at the time of assembling, so that assembling work can be performed more safely.

The side member protruding portion 721 is disposed in the recess portion 621a formed in the insulating plate protruding portion 621. As described above, the movement of the side member protruding portion 721 can be regulated by disposing the side member protruding portion 721 in the recess portion 621a of the insulating plate protruding portion 621. With such a configuration, the movement of the side member protruding portion 721 which regulates the movement of the energy storage device 100 is regulated, and hence the movement of the energy storage device 100 can be further regulated. By arranging the insulating plate protruding portions 621 between the electrode terminals 120 and arranging the side member protruding portions 721 in the recess portions 621a, the gaps formed between the side member protruding portions 721 and the electrode terminals 120 are reduced, so that the movement of the energy storage device 100 can be further regulated. It is also possible to ensure insulation between the two electrode terminals 120 sandwiching the insulating plate protruding portion 621.

The side member protruding portions 721 are arranged in the recess portions 621a of the insulating plate protruding portions 621, and hence, for example, in a case in which the side members 700 and the insulating plates 600 are assembled in advance and then mounted on the plurality of energy storage devices 100, it is possible to prevent the insulating plate protruding portions 621 from shifting from the side member protruding portion 721. Thus, the assembly work can be performed more safely.

Since the side member protruding portion 721 is a conductive member, the insulating property around the side member protruding portion 721 can be improved by disposing the side member protruding portion 721 in the recess portion 621a of the insulating plate protruding portion 621. Insulation between the side member protruding portion 721 and the electrode terminal 120 or the bus bar 800 can be improved.

This will be described in more detail below. In the conventional configuration in which the side member protruding portion 721 is disposed outside the electrode terminal 120, the side member protruding portion 721 is disposed within a range in which the side member protruding portion 721 does not intersect with the electrode terminal 120, and hence not much consideration is given to a short circuit with the bus bar 800. However, in this embodiment, the side member protruding portion 721 is disposed between the two electrode terminals 120. Accordingly, the side member 700 is disposed immediately below the placement position of the bus bar 800, and it is necessary to consider a possibility that the bus bar 800 and the side member 700 are brought into contact with each other to cause a short circuit. On the other hand, since the side member protruding portion 721 is disposed in the recess portion 621a of the insulating plate protruding portion 621, the periphery of the side member protruding portion 721 is covered with the insulating member. As a result, it is possible to prevent the side member protruding portion 721 from coming into contact with the bus bar 800 and short-circuiting, and hence it is possible to more safely perform the assembly work.

[7 Description of Modification]

Although the energy storage apparatus 10 according to this embodiment has been described above, the present invention is not limited to the above-mentioned embodiment. That is, the embodiment disclosed herein is exemplary in all respects and not exhaustive, and the scope of the present invention is defined by the claims and includes all modifications within the meaning and scope equivalent to the claims.

In the above embodiment, the side member 700 is a plate-like side plate made of metal. However, the side member 700 may be an insulating member made of resin or the like, or may be a block-shaped or rod-shaped member or the like.

In the above-mentioned embodiment, the side member protruding portions 721 of the side members 700 are arranged between the two electrode terminals 120 of the adjacent energy storage devices 100. However, depending on the placement position of the electrode terminal 120, the side member protruding portion 721 may not be disposed between the two electrode terminals 120. The same applies to the insulating plate protruding portions 621 of the insulating plates 600.

In the above embodiment, the two side member protruding portions 721 are arranged at positions sandwiching both sides of the electrode terminal 120. However, one side member protruding portion 721 may be disposed on one side of the electrode terminal 120. The same applies to the insulating plate protruding portion 621.

In the above-mentioned embodiment, the side member protruding portions 721 are arranged across the two energy storage devices 100. However, the side member protruding portion 721 may be disposed on one energy storage device 100 instead of being arranged across the two energy storage devices 100. The same applies to the insulating plate protruding portion 621.

In the above-mentioned embodiment, the insulating plate 600 has the insulating plate protruding portions 621 in which the recess portions 621a are formed as the insulating members arranged between the energy storage device 100 and the side member protruding portion 721. However, the shape of the insulating plate protruding portion 621 is not particularly limited, and the insulating plate protruding portion 621 may be a plate-like or sheet-like protruding portion which is disposed between the energy storage device 100 and the side member protruding portion 721. The insulating member may be an insulating member formed separately from the insulating plate 600 instead of the insulating plate protruding portion 621.

In the above-mentioned embodiment, the energy storage apparatus 10 includes the insulating plates 600 between the plurality of energy storage devices 100 and the side members 700. However, in a case in which insulation between the energy storage device 100 and the side member 700 can be ensured or there is no need to ensure the insulation, the energy storage apparatus 10 may not include the insulating plates 600.

In the above embodiment, all the side member protruding portions 721 of the side member 700 have the above configuration, but any one of the side member protruding portions 721 may have a configuration different from the above configuration. The same applies to the insulating plate protruding portions 621 of the insulating plate 600.

In the above embodiment, both the side members 700 on the Z-axis plus direction side and the Z-axis minus direction side have the above configuration, but the side member 700 on the Z-axis plus direction side or the Z-axis minus direction side may have a configuration different from the above configuration. The same applies to the insulating plates 600.

A mode constructed by arbitrarily combining the components included in the above embodiment and the modifications thereof is also included in the scope of the present invention.

The present invention can be implemented not only as the energy storage apparatus 10 but also as the side members 700 and the insulating plates 600 included in the energy storage apparatus 10.

INDUSTRIAL APPLICABILITY

The present invention can be applied to an energy storage apparatus or the like including an energy storage device such as a lithium ion secondary battery.

DESCRIPTION OF REFERENCE SIGNS

10: energy storage apparatus
100: energy storage device
101: first energy storage device
102: second energy storage device
103: third energy storage device
120: electrode terminal
121: first electrode terminal
122: second electrode terminal
123: third electrode terminal
600: insulating plate
621: insulating plate protruding portion
621a: recess portion
621b: first insulating plate protruding portion
621c: second insulating plate protruding portion
700: side member
721: side member protruding portion
721a: first side member protruding portion
721b: second side member protruding portion

The invention claimed is:

1. An energy storage apparatus comprising:
a plurality of energy storage devices arranged in a first direction and including electrode terminals on one side in a second direction intersecting the first direction; and
a side member arranged on a side of the plurality of energy storage devices in a third direction intersecting the first direction and the second direction,
wherein the plurality of energy storage devices includes:
a first energy storage device; and
a second energy storage device adjacent to the first energy storage device in the first direction,
wherein the first energy storage device includes a first electrode terminal among the electrode terminals,
wherein the second energy storage device includes a second electrode terminal among the electrode terminals,
wherein the side member includes a first protruding portion protruding in a direction opposite to the third direction and being arranged on the one side in the second direction of the first energy storage device among the plurality of energy storage devices and on a one side in the first direction of the first electrode terminal of the first energy storage device,
wherein the first protruding portion is arranged between the first electrode terminal and the second electrode terminal in the first direction, wherein the first protruding portion is disposed to overlap the first electrode terminal and the second electrode terminal as viewed in the first direction, wherein the side member further includes a second protruding portion protruding in a direction opposite to the third direction and being arranged on the one side of the first energy storage device in the second direction and on the other side of the electrode terminal of the first energy storage device in the first direction, further comprising an insulating member disposed between the first energy storage device and the first protruding portion, wherein the insulating member includes an insulating member protruding portion which protrudes in the third direction towards the first energy storage device, and wherein the insulating member protruding portion is a rectangular parallelepiped which is disposed on a side of the first energy storage device in the second direction.

2. The energy storage apparatus according to claim 1, further comprising an insulating plate disposed between the plurality of energy storage devices and the side member, wherein the insulating member is provided on the insulating plate.

3. The energy storage apparatus according to claim 1, wherein the first protruding portion is disposed in a recess portion formed in the insulating member.

4. The energy storage apparatus according to claim 1, wherein the insulating member protruding portion includes a recess portion recessed into the insulating member in the third direction from a top surface thereof.

5. The energy storage apparatus according to claim 4, wherein the recess portion is surrounded on all sides by an inner wall surface of the insulating member protruding portion.

6. The energy storage apparatus according to claim 1, wherein, in the second direction, a first part of the insulating member protruding portion is disposed between the first protruding portion and the first energy storage device, and wherein, in the second direction, a second part of the insulating member protruding portion is disposed on a side of the first protruding portion opposite to the first energy storage device.

7. The energy storage apparatus according to claim 1, wherein, in the second direction, a part of the insulating member protruding portion is disposed on each side of the first protruding portion.

8. An energy storage apparatus comprising:
a plurality of energy storage devices arranged in a first direction and including electrode terminals on one side in a second direction intersecting the first direction; and
a side member arranged on a side of the plurality of energy storage devices in a third direction intersecting the first direction and the second direction, wherein the plurality of energy storage devices includes:
a first energy storage device; and
a second energy storage device adjacent to the first energy storage device in the first direction, wherein the first energy storage device includes a first electrode terminal among the electrode terminals, wherein the second energy storage device includes a second electrode terminal among the electrode terminals, wherein the side member includes a first protruding portion protruding in a direction opposite to the third direction and being arranged on the one side in the second direction of the first energy storage device among the plurality of energy storage devices and on a one side in the first direction of the first electrode terminal of the first energy storage device, wherein the first protruding portion is arranged between the first electrode terminal and the second electrode terminal in the first direction, wherein the first protruding portion is disposed to overlap the first electrode terminal and the second electrode terminal as viewed in the first direction, wherein the side member further includes a second protruding portion protruding in a direction opposite to the third direction and being arranged on the one side of the first energy storage device in the second direction and on the other side of the electrode terminal of the first energy storage device in the first direction, further comprising an insulating member disposed between the first energy storage device and the first protruding portion, wherein the insulating member includes an insulating member protruding portion which protrudes in the third direction towards the first energy storage device, wherein the insulating member protruding portion includes a recess portion recessed into the insulating member in the third direction from a top surface thereof, and wherein the first protruding portion is inserted, in the third direction, inside of the recess portion of the insulating member protruding portion.

9. An energy storage apparatus comprising:
a plurality of energy storage devices arranged in a first direction and including electrode terminals on one side in a second direction intersecting the first direction; and
a side member arranged on a side of the plurality of energy storage devices in a third direction intersecting the first direction and the second direction, wherein the plurality of energy storage devices includes:
a first energy storage device; and
a second energy storage device adjacent to the first energy storage device in the first direction, wherein the first energy storage device includes a first electrode terminal among the electrode terminals, wherein the second energy storage device includes a second electrode terminal among the electrode terminals, wherein the side member includes a first protruding portion protruding in a direction opposite to the third direction and being arranged on the one side in the second direction of the first energy storage device among the plurality of energy storage devices and on a one side in the first direction of the first electrode terminal of the first energy storage device, wherein the first protruding portion is arranged between the first electrode terminal and the second electrode terminal in the first direction, wherein the first protruding portion is disposed to overlap the first electrode terminal and the second electrode terminal as viewed in the first direction, wherein the side member further includes a second protruding portion protruding in a direction opposite to the third direction and being arranged on the one side of the first energy storage device in the second direction and on the other side of the electrode terminal of the first energy storage device in the first direction, further comprising an insulating member disposed between the first energy storage device and the first protruding portion, wherein the insulating member includes an insulating member protruding portion which protrudes in the third direction towards the first energy storage device, wherein the insulating member protruding portion includes a recess portion recessed into the insulating member in the third direction from a top surface thereof, wherein the recess portion is surrounded on all sides by an inner wall surface of the insulating member protruding portion, and wherein the first protruding portion is inserted, in the third direction, inside of the recess portion of the insulating member protruding portion.

* * * * *